United States Patent
Wiles et al.

(10) Patent No.: US 10,538,168 B2
(45) Date of Patent: Jan. 21, 2020

(54) METHOD AND APPARATUS FOR ASSEMBLY OF A BATTERY ARRAY

(71) Applicant: FORD GLOBAL TECHNOLOGIES, LLC, Dearborn, MI (US)

(72) Inventors: Jacob Wiles, Plymouth, MI (US); Alexander Bartlett, Wyandotte, MI (US); Bikram Singh, Royal Oak, MI (US); Baocheng Sun, Beverly Hills, MI (US); Dylan Erb, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 223 days.

(21) Appl. No.: 15/465,777

(22) Filed: Mar. 22, 2017

(65) Prior Publication Data

US 2018/0272887 A1    Sep. 27, 2018

(51) Int. Cl.
*H01M 2/10* (2006.01)
*H01M 10/04* (2006.01)
*B60L 11/18* (2006.01)

(52) U.S. Cl.
CPC ....... *B60L 11/1877* (2013.01); *H01M 2/1094* (2013.01); *H01M 10/0481* (2013.01)

(58) Field of Classification Search
CPC .................................................. H01M 2/1077
See application file for complete search history.

(56) References Cited

U.S. PATENT DOCUMENTS

| 8,802,264 B2 | 8/2014 | Lin et al. |
| 8,968,912 B2 | 3/2015 | Maguire et al. |
| 9,484,562 B2 | 11/2016 | Utley et al. |
| 2016/0093849 A1 | 3/2016 | DeKeuster et al. |
| 2016/0204400 A1 | 7/2016 | Baek et al. |

FOREIGN PATENT DOCUMENTS

| DE | 102011112531 B3 | * 12/2012 |
| KR | 20140084620 | 7/2014 |
| WO | 2013034204 | 3/2013 |

OTHER PUBLICATIONS

How Nissan Makes its Electric Car Battery Packs, Part Three of Three: Cells to Car, by Nikki Gordon-Bloomfield, Dec. 4, 2014 (https://transportevolved.com/2014/12/04/nissan-makes-electric-car-battery-packs-part-three-three-cells-cars/).

* cited by examiner

*Primary Examiner* — Stephan J Essex
(74) *Attorney, Agent, or Firm* — David B. Kelley; Carlson, Gaskey & Olds, P.C.

(57) ABSTRACT

A method according to an exemplary aspect of the present disclosure includes, among other things, compressing at least one battery module to a desired dimension prior to installing the battery module into an array. Another method according to an exemplary aspect of the present disclosure includes, among other things, inducing a residual stress into a battery module to compress the battery module to a desired dimension prior to being installed in an array. An apparatus, according to an exemplary aspect of the present disclosure includes, among other things, a compression device configured to temporarily compress at least one battery module to a desired dimension prior to installing the battery module into an array.

14 Claims, 3 Drawing Sheets

METHOD AND APPARATUS FOR ASSEMBLY OF A BATTERY ARRAY

TECHNICAL FIELD

This disclosure relates to a method and apparatus for assembly of a battery array for an electrified vehicle. A compressive force is applied to a battery module to induce a residual stress prior to the battery module being installed into the battery array.

BACKGROUND

The need to reduce automotive fuel consumption and emissions is well known. Therefore, vehicles are being developed that reduce or completely eliminate reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

A high voltage battery pack for powering electric machines and other electrical loads typically includes multiple battery assemblies, or battery arrays, that include a plurality of interconnected battery modules comprised of battery cells. An overall thickness of a non-rigid battery module assembled from a batch of battery cells can vary from a battery module assembled from a subsequent batch of battery cells. This can cause assembly issues when an array length is fixed.

Battery modules are composed of interlocking frames with the battery cells being located inside the frames. This type of arrangement can lead to bulging when cell stack-up is at a maximum. If the overall length of the battery modules to be assembled into the battery array is greater than the fixed length of the array, then additional forces must be applied to the module assembly, such as hammering, prying or bending for example, which is not desirable. Therefore, more efficient assembly methods are desired.

SUMMARY

A method according to an exemplary aspect of the present disclosure includes, among other things, compressing at least one battery module to a desired dimension prior to installing the battery module into an array.

In a further non-limiting embodiment of the foregoing method, the compressing step includes compressing a plurality of battery modules to the desired dimension to provide a plurality of compressed battery modules.

In a further non-limiting embodiment of either of the foregoing methods, the method includes defining the desired dimension as a nominal thickness for the battery module.

In a further non-limiting embodiment of any of the foregoing methods, the method includes defining a fixed length for the array, and installing one or more compressed battery modules into the array such that a summation of a thickness of each battery module installed does not exceed the fixed length.

In a further non-limiting embodiment of any of the foregoing methods, the compressing step includes only compressing battery modules that have a thickness that exceeds the nominal thickness.

In a further non-limiting embodiment of any of the foregoing methods, each battery module is comprised of a plurality of stacked battery cells, and a plurality of compressed battery modules are installed into the array.

In a further non-limiting embodiment of any of the foregoing methods, the compressing step includes applying a pressure against one end of the battery module to reduce a thickness of the battery module to the nominal thickness prior to installing the battery module into the array.

In a further non-limiting embodiment of any of the foregoing methods, the method includes releasing the pressure after compression and prior to installing the compressed battery module into the array.

In a further non-limiting embodiment of any of the foregoing methods, the compressing step includes applying pressure to the battery module to induce a desired amount of residual stress in the battery module sufficient to temporarily hold the battery module at the desired dimension, releasing the pressure when the battery module is at the desired dimension, and subsequently installing the battery module with the desired dimension into the array.

In a further non-limiting embodiment of any of the foregoing methods, the residual stress gradually releases over time such that the battery module relaxes after being installed in the array.

A method according to another exemplary aspect of the present disclosure includes, among other things, inducing a residual stress into a battery module to compress the battery module to a desired dimension prior to being installed in an array.

In a further non-limiting embodiment of any of the foregoing methods, each battery module is comprised of a plurality of stacked battery cells, and the inducing step includes applying pressure to the battery module to induce the residual stress in the battery module to a level that is sufficient to temporarily compress the battery module to the desired dimension.

In a further non-limiting embodiment of any of the foregoing methods, the method includes releasing the pressure when the battery module is at the desired dimension to provide a compressed battery module, and subsequently installing the compressed battery module into the array.

In a further non-limiting embodiment of any of the foregoing methods, the method includes defining the desired dimension as a nominal thickness for the battery module, providing a set of battery modules to be installed in the array, and only compressing battery modules that have a thickness that exceeds the nominal thickness prior to installation into the array.

In a further non-limiting embodiment of any of the foregoing methods, the method includes defining a fixed length for the array, and installing the set of battery modules into the array such that a summation of the nominal thicknesses of each battery module does not exceed the fixed length.

An apparatus according to another exemplary aspect of the present disclosure includes, among other things, a compression device configured to temporarily compress at least one battery module to a desired dimension prior to installing the battery module into an array.

In a further non-limiting embodiment of the foregoing apparatus, the compression device includes an actuator that is controlled by a controller to apply a pressure to the battery module to induce a desired amount of residual stress in the battery module that is sufficient to temporarily hold the battery module at the desired dimension, and wherein the controller generates a release signal to release the pressure when the battery module is at the desired dimension such that the battery module with the desired dimension can subsequently be installed into the array.

In a further non-limiting embodiment of either of the foregoing apparatus, the compression device includes a table with a nest to receive the battery module, the nest including at least a first wall held fixed relative to the table and a second wall axially spaced from and moveable in a direction toward the first wall by the actuator in response to a compression signal generated by the controller, and wherein the battery module is received within the nest between the first and second walls.

In a further non-limiting embodiment of any of the foregoing apparatus, the desired dimension is defined as a nominal thickness for the battery module, and wherein the controller generates a compression signal to move the actuator to compress the battery modules that have a thickness that exceeds the nominal thickness.

In a further non-limiting embodiment of any of the foregoing apparatus, the actuator comprises a linear actuator.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary battery modules that are installed into a battery array that may be employed within an electrified vehicle. An exemplary battery module is compressed to a desired dimension prior to installing the battery module into the array. In some embodiments, a plurality of battery modules are compressed to the desired dimension prior to installing the battery modules into the array. These and other features are discussed in greater detail in the following paragraphs of this detailed description.

Figure 1:
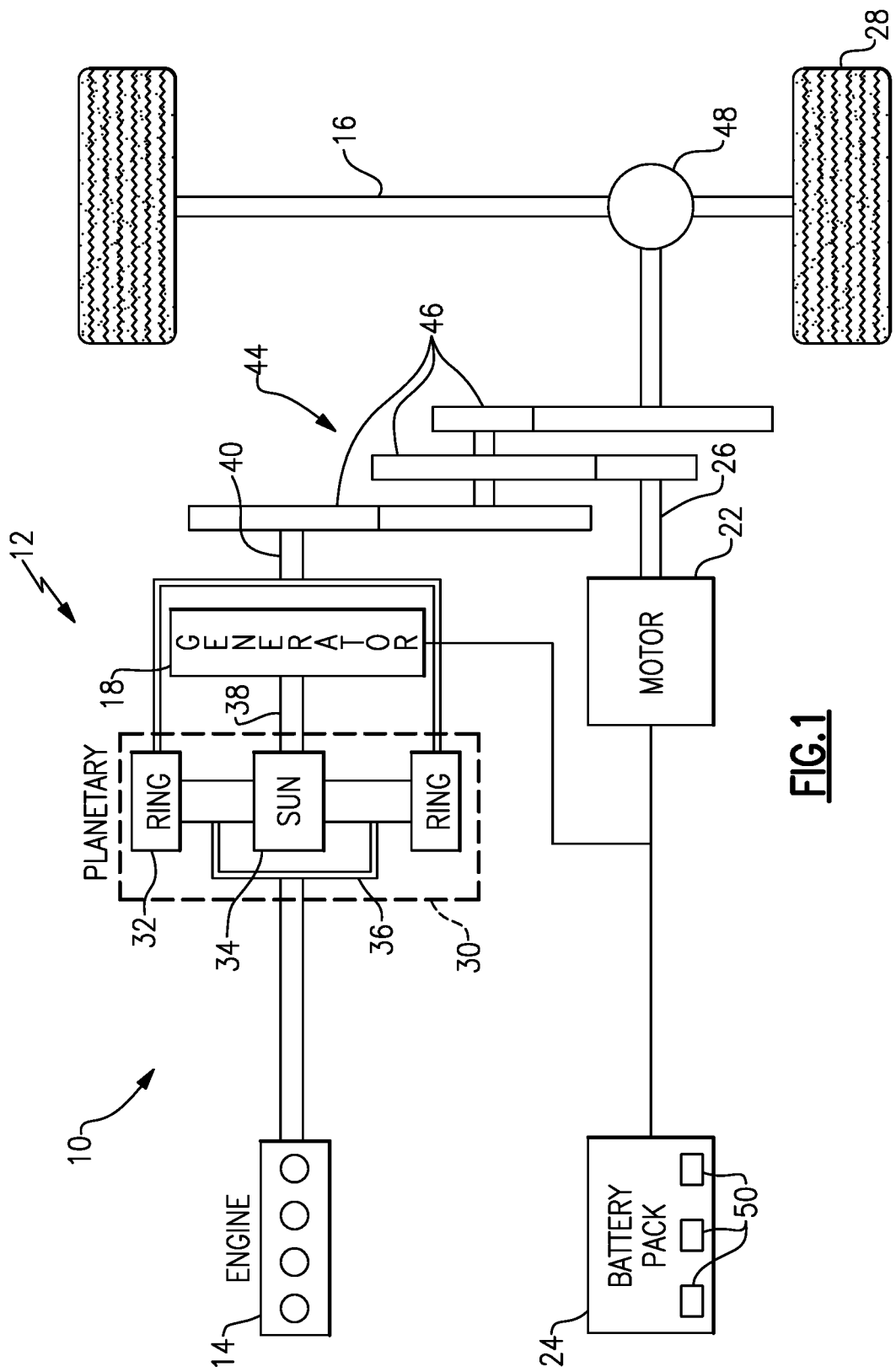
FIG. 1 schematically illustrates a powertrain of an electrified vehicle.

FIG. 1 schematically illustrates a powertrain 10 of an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's) and fuel cell vehicles.

In one non-limiting embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle 12. Although a power-split configuration is shown, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 16 through the differential 48 to distribute torque to the vehicle drive wheels 28.

The motor 22 can also be employed to drive the vehicle drive wheels 28 by outputting torque to a shaft 26 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes a plurality of battery assemblies 50 (i.e., battery arrays or groupings of battery cells) capable of outputting electrical power to operate the motor 22, the generator 18 and/or other electrical loads of the electrified vehicle 12. Other types of energy storage devices and/or output devices can also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
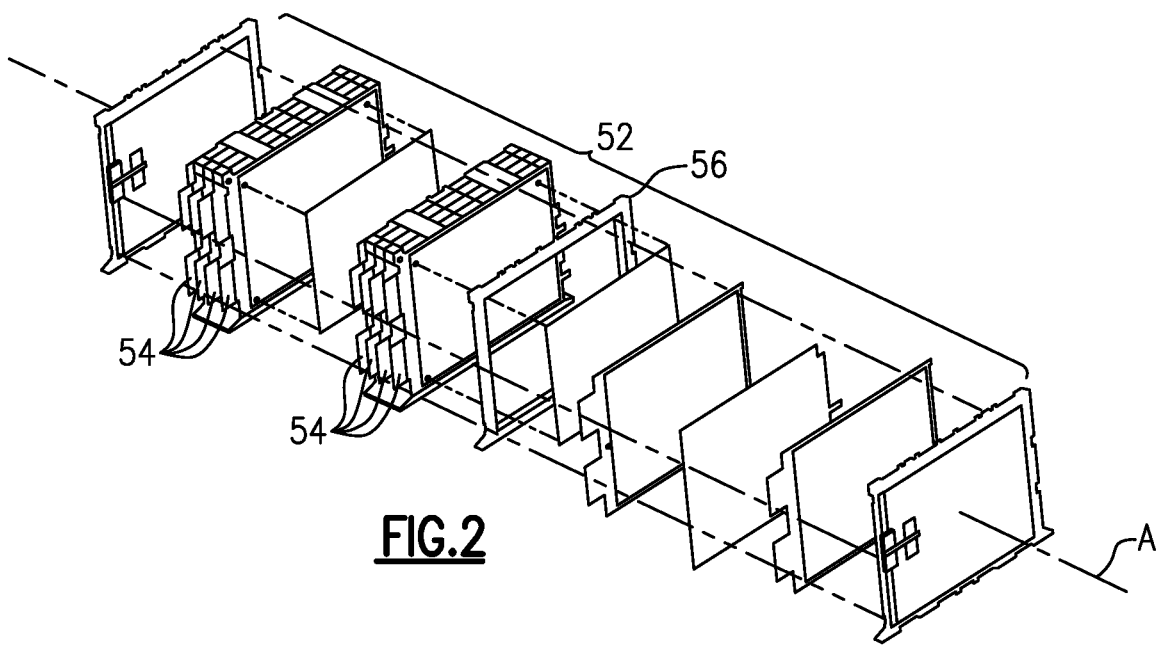
FIG. 2 is an exploded view of a battery module comprised of a plurality of battery cells.

As shown in FIG. 1, the battery pack 24 is comprised of one or more battery arrays 50. Each array 50 is comprised of a plurality of battery modules 52. FIG. 2 illustrates a battery module 52 that includes a plurality of battery cells 54 for supplying electrical power to various electrical loads of the electrified vehicle 12. Although a specific number of battery cells 54 are depicted in FIG. 2, the battery module 52 could employ a greater or fewer number of battery cells 54 within the scope of this disclosure. In other words, this disclosure is not limited to the specific configuration shown in FIG. 2.

The battery cells 54 may be stacked side-by-side along a longitudinal axis A to construct a grouping of battery cells 54, sometimes referred to as a "cell stack." Of course, the battery cells 54 could be grouped in other configurations. In one non-limiting embodiment, the battery cells 54 are pouch cells. However, battery cells having other geometries (cylindrical, prismatic, lithium-ion cells, etc.), other chemistries (nickel-metal hydride, lead-acid, etc.), or both, are contemplated within the scope of this disclosure. Examples of battery modules include 10 or 20 cell configurations; however, other configurations that include fewer or more cells are also contemplated.

Figure 3:
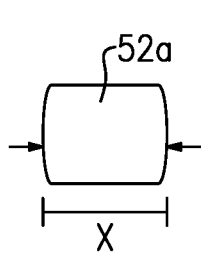
FIG. 3 is a schematic representation of an uncompressed battery module with no residual stress.

The battery cells 54 are supported by a frame structure 56 positioned around a periphery of the cells 54. This type of arrangement can lead to bulging when cell stack-up is at a maximum. An example of a bulging battery module 52a is shown in FIG. 3. This bulging battery module 52a has a thickness T that is defined by a dimension X. If the overall summation of thicknesses of the battery modules 52 to be assembled into the battery array 50 is greater than a fixed length of the array 50, then it is difficult to assemble the modules 52 into the array 50 without hammering, prying, or bending the modules.

Figure 4:
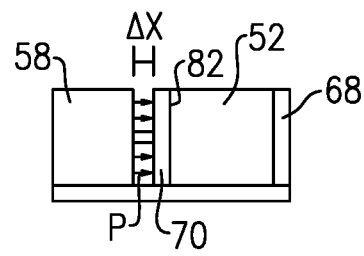
FIG. 4 is a schematic representation of a compressive force being applied to the battery module of FIG. 3 to compress the battery module to a desired dimension and to induce residual stress.
Figure 5:
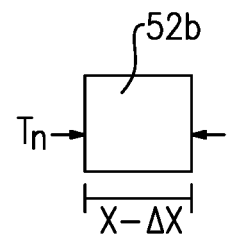
FIG. 5 is a schematic representation of a compressed battery module with residual stress.

The subject invention provides a method, according to one example that includes, among other things, compressing at least one battery module 52 (FIG. 4) to a desired dimension to provide a compressed battery module 52b prior to installing the battery module 52 into the array 50. An example of a compressed battery module 52b is shown in FIG. 5. In another example, a plurality of battery modules 52 are compressed to the desired dimension to provide a plurality of compressed battery modules 52b.

In one example, the desired dimension is defined as a nominal thickness Tn for the battery module 52. As shown in FIG. 4, a compression device 58 applies a pressure P against one end 82 of the battery module 52 to reduce a thickness of the battery module 52 to the nominal thickness Tn prior to installing the battery module 52 into the array 50. In the example shown in FIG. 4, the compression device 58 reduces a thickness of the battery module 52 by a distance ΔX to the nominal thickness Tn as shown in FIG. 5.

Figure 6:
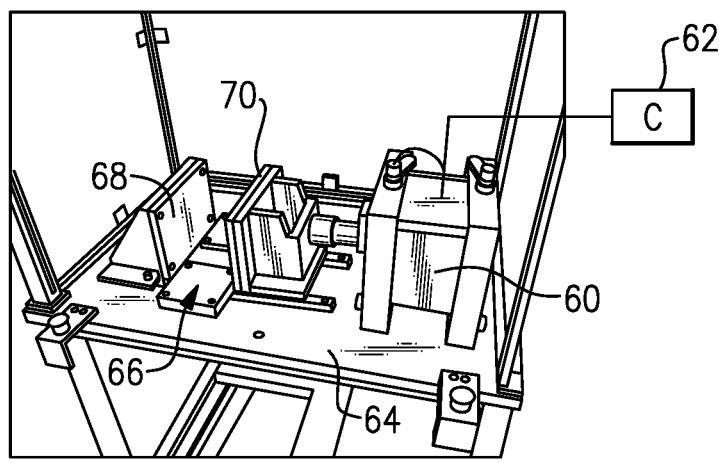
FIG. 6 illustrates an example of an apparatus used to apply the compressive force of FIG. 4.

One example of the compression device 58 is shown in FIG. 6. The compression device 58 is configured to temporarily compress the battery module 52 to the nominal thickness dimension Tn prior to installing the battery module 52 into the array 50. The compression device 58 includes an actuator 60 that is controlled by a controller 62 to apply a pressure to the battery module 52 to induce a desired amount of residual stress in the battery module 52 that is sufficient to temporarily hold the battery module 52 at the desired dimension for the nominal thickness Tn. The controller 62 generates a release signal to release the pressure when the battery module 52 is at the desired dimension such that the compressed battery module 52b can subsequently be installed into the array 50.

In one example, the controller 62 comprises one or more computers that include processors, memory, interface devices, etc., and which are programmed to identify modules that exceed the nominal thickness and to generate the compression and release signals for the actuator 60 as needed to provide the compressed modules. An exemplary actuator 60 may comprise a linear actuator such as a hydraulic cylinder, air cylinder, or other similar device. The controller 62 is programmed to modulate the amount of residual stress induced into the battery module by controlling the compression distance or compression force using a pressure transducer or other similar device, for example.

In the example shown in FIG. 6, the compression device 58 includes a table 64 with a nest 66 configured to receive the battery module 52. The nest 66 includes at least a first wall 68 held fixed relative to the table 64 and a second wall 70 axially spaced from and moveable in a direction toward the first wall 68 by the actuator 60 in response to a compression signal generated by the controller 62. The battery module 52 is received within the nest 66 between the first 68 and second 70 walls. Once the battery module 52 is positioned within the nest, the actuator 60 moves the second wall 70 toward the battery module 52 and will compress the module by an amount of ΔX to achieve the nominal thickness Tn. In one example, the second 70 wall is set to have a maximum travel length toward the first wall 68 such that the distance between the walls at the maximum travel length is the desired nominal thickness dimension.

Once the compressed battery module 52b is at the nominal thickness Tn, the pressure is released and the battery module 52b is removed from the table 64. The residual stress induced by the compression temporarily holds the module at the nominal thickness Tn for a short period of time allowing for installation of the module into the array 50. In one example, the actuator 60 applies a pressure that does not exceed 3600 pounds of force; however, other levels of force could be used depending upon the application.

Figure 7:
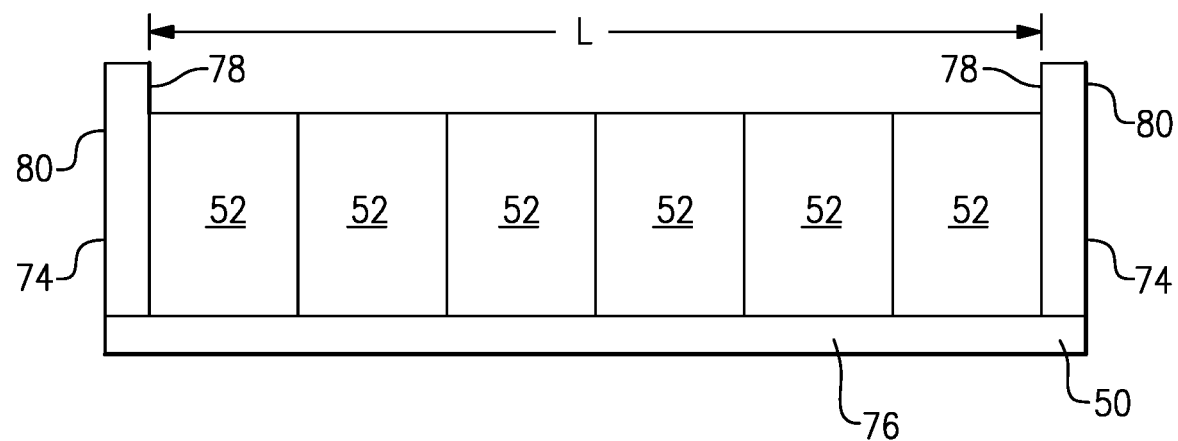
FIG. 7 illustrates one or more compressed battery modules as installed into an array.

As shown in FIG. 7, the array 50 may include two or more array plates 74 that are configured to axially constrain the stacked battery modules. In one non-limiting embodiment, the array plates 74 are disposed at longitudinal extents of the battery pack 24 (FIG. 1). The array 50 may optionally include a bottom support structure 76. The array plates 74 and bottom support structure 76 could be made of either metallic materials (aluminum, steel, etc.) or plastic materials. The general size and shape of the array plates 74 is not intended to limit this disclosure.

The array plates 74 include a first side region 78 and a second side region 80 opposite of the first side region 78. In one non-limiting embodiment, the first side region 78 faces toward the battery modules 52 to be installed within the array 50 and the second side region 80 faces in a direction away from the battery modules 52. In one example, the array 50 has a fixed installation length L that is defined between the first side regions 78 of the opposing array plates 74. One or more compressed battery modules 52 are installed into the array 50 such that a summation of a thickness T of each battery module 52 installed does not exceed the fixed length L. Thus, each array 50 may be comprised of a combination of compressed battery modules and battery modules that were not compressed because the modules did not exceed the nomination thickness.

In one example, the number of modules 52 installed within an array 50 can range between four to seven modules. Once the compressed modules are installed within the array 50, the residual stress gradually releases over time such that the battery module 52 relaxes after being installed in the array 50. The temporary reduction in thickness of the module decreases overall module stack-up during array installation, which facilitates fitment of the modules and eliminates the need for prying or hammering on the modules.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
   compressing at least one battery module to a desired dimension prior to installing the battery module into an array to induce a residual stress into the battery module, and wherein the compressing step includes:
   applying pressure to the battery module to induce the residual stress in the battery module to a level that is sufficient to temporarily compress the battery module to the desired dimension.

2. The method as recited in claim 1, wherein the compressing step includes:
   compressing a plurality of battery modules to the desired dimension to provide a plurality of compressed battery modules.

3. The method as recited in claim 2, comprising:
   defining the desired dimension as a nominal thickness for the battery module.

4. The method as recited in claim 3, comprising:
   defining a fixed length for the array, and
   installing one or more compressed battery modules into the array such that a summation of a thickness of each battery module installed does not exceed the fixed length.

5. The method as recited in claim 3, wherein the compressing step includes:
   only compressing battery modules that have a thickness that exceeds the nominal thickness.

6. The method as recited in claim 3, wherein each battery module is comprised of a plurality of stacked battery cells, and wherein a plurality of compressed battery modules are installed into the array.

7. The method as recited in claim 3, wherein the compressing step includes:
   applying a pressure against one end of the battery module to reduce a thickness of the battery module to the nominal thickness prior to installing the battery module into the array.

8. The method as recited in claim 7, comprising:
   releasing the pressure after compression and prior to installing the compressed battery module into the array.

9. A method, comprising:
   compressing at least one battery module to a desired dimension prior to installing the battery module into an array, and wherein the desired dimension is defined as a nominal thickness for the battery module;
   compressing a plurality of battery modules to the desired dimension to provide a plurality of compressed battery modules;
   applying a pressure against one end of the battery module to reduce a thickness of the battery module to the nominal thickness prior to installing the battery module into the array; and
   wherein the compressing step includes:
   applying pressure to the battery module to induce a desired amount of residual stress in the battery module sufficient to temporarily hold the battery module at the desired dimension,
   releasing the pressure when the battery module is at the desired dimension, and
   subsequently installing the battery module with the desired dimension into the array.

10. The method as recited in claim 9, wherein the residual stress gradually releases over time such that the battery module relaxes after being installed in the array.

11. A method, comprising:
    inducing a residual stress into a battery module to compress the battery module to a desired dimension prior to being installed in an array, wherein each battery module is comprised of a plurality of stacked battery cells, and wherein the inducing step includes:
    applying pressure to the battery module to induce the residual stress in the battery module to a level that is sufficient to temporarily compress the battery module to the desired dimension.

12. The method as recited in claim 11, comprising:
    releasing the pressure when the battery module is at the desired dimension to provide a compressed battery module, and
    subsequently installing the compressed battery module into the array.

13. The method as recited in claim 11, comprising:
    defining the desired dimension as a nominal thickness for the battery module,
    providing a set of battery modules to be installed in the array, and only compressing battery modules that have a thickness that exceeds the nominal thickness prior to installation into the array.

14. The method as recited in claim 13, comprising:

defining a fixed length for the array, and installing the set of battery modules into the array such that a summation of the nominal thicknesses of each battery module does not exceed the fixed length.

\* \* \* \* \*